United States Patent

[11] 3,618,798

| [72] | Inventor | Melvin E. Dreier<br>Dumont, Iowa 50625 |
|---|---|---|
| [21] | Appl. No. | 9,692 |
| [22] | Filed | Feb. 9, 1970 |
| [45] | Patented | Nov. 9, 1971 |

[54] DISTRIBUTOR SPOUT FOR GRAIN AND SILAGE
5 Claims, 10 Drawing Figs.

[52] U.S. Cl.................................................. 241/39,
193/3, 214/17 C, 302/60
[51] Int. Cl.........................................B65g 53/40,
B65g 65/32, B02c 9/00
[50] Field of Search........................................... 285/184,
194, 201, 205; 302/9, 10, 60–64; 146/253; 241/39,
40; 214/17 C; 193/3

[56] References Cited
UNITED STATES PATENTS

| 3,321,252 | 5/1967 | Dreier | 302/60 |
|---|---|---|---|
| 1,199,198 | 9/1916 | Martin | 302/60 X |
| 864,209 | 8/1907 | Stokoe | 146/253 |
| 258,341 | 5/1882 | Ager | 241/39 X |
| 1,046,290 | 12/1912 | Granville | 241/40 |
| 2,054,280 | 9/1936 | Brown | 241/40 X |
| 1,768,621 | 7/1930 | Lykken | 241/39 |
| 1,254,889 | 1/1918 | Determann | 302/10 |

*Primary Examiner*—Richard E. Aegerter
*Assistant Examiner*—W. Scott Carson
*Attorney*—Morton S. Adler

ABSTRACT: A spout structure, attachable to a fill pipe, for directing grain and silage into a silo is adaptable with slight modification for either a center fill or a side fill operation and includes a plurality of different directional flow channels that divide the grain and silage so that there is uniform distribution of the same within the silo. One embodiment of this spout is designed especially for use with corn and includes certain obstructions in the flow channels for cracking the corn during delivery of the same to the silo.

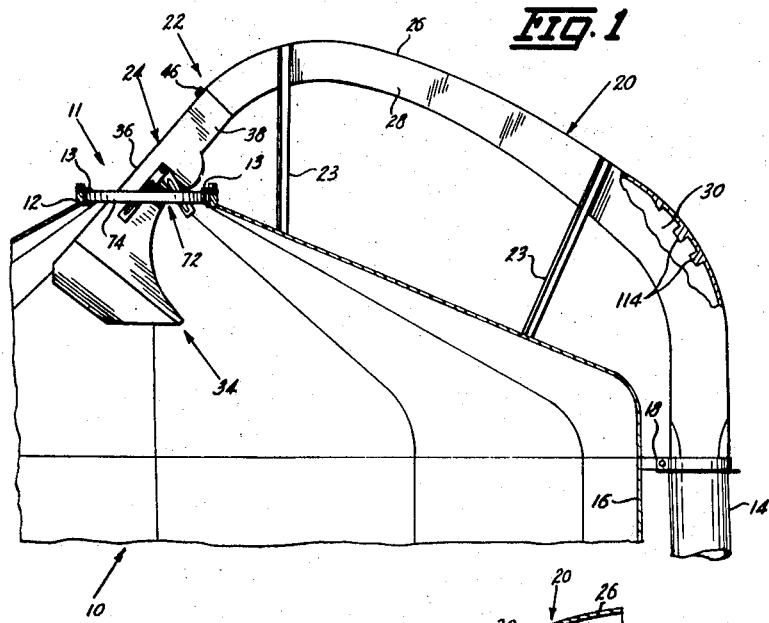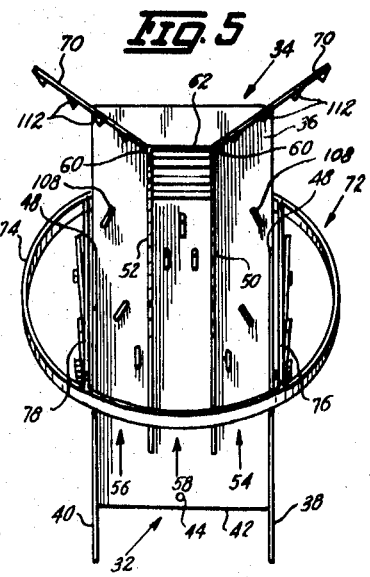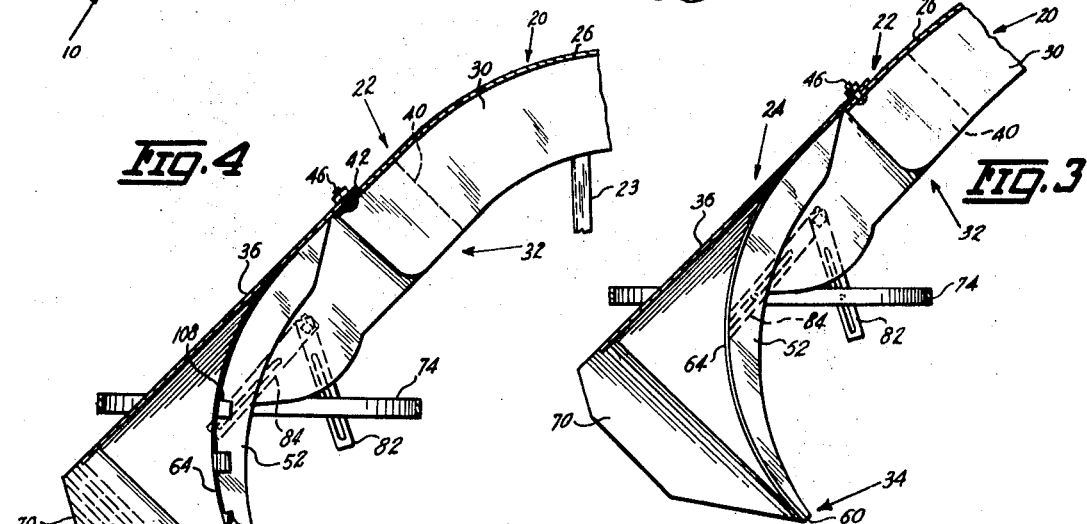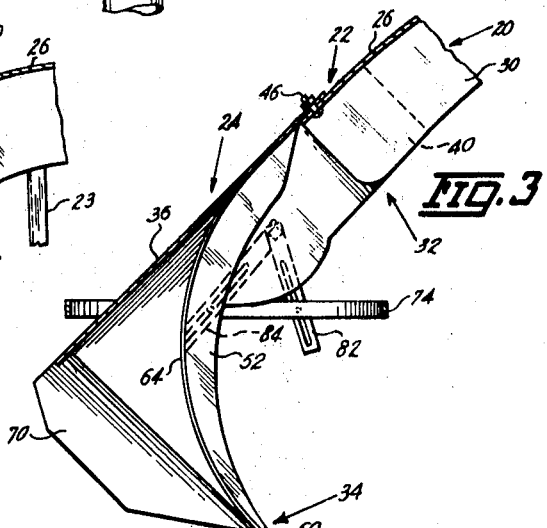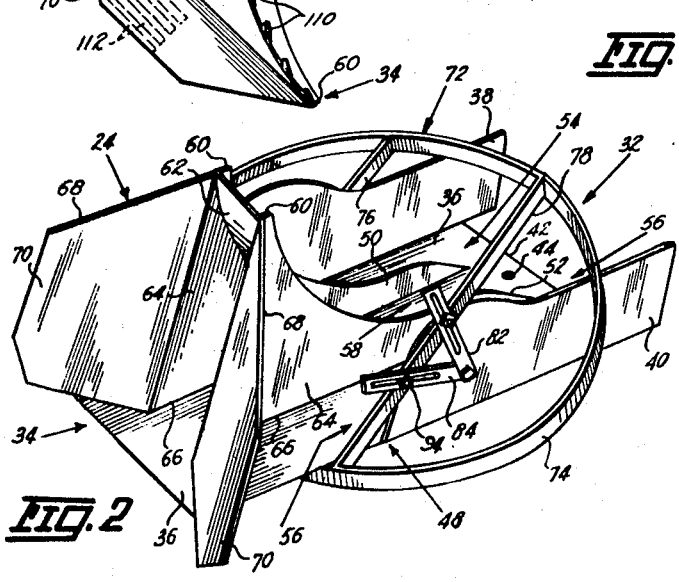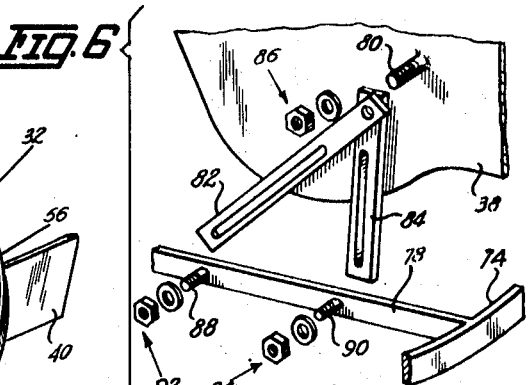
INVENTOR.
MELVIN E. DREIER
ATTORNEY.

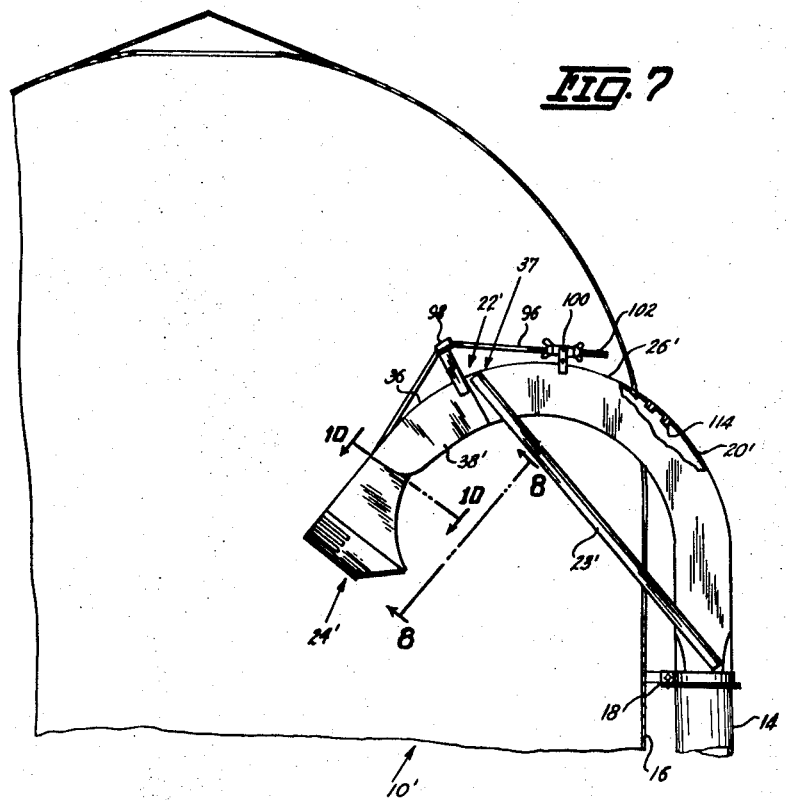
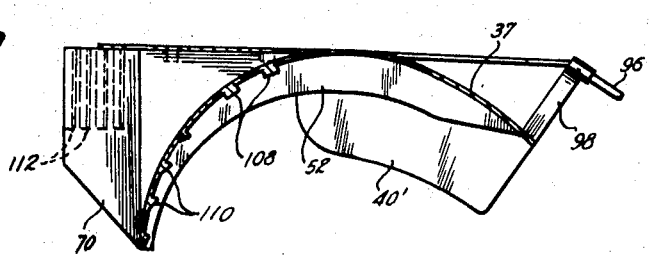
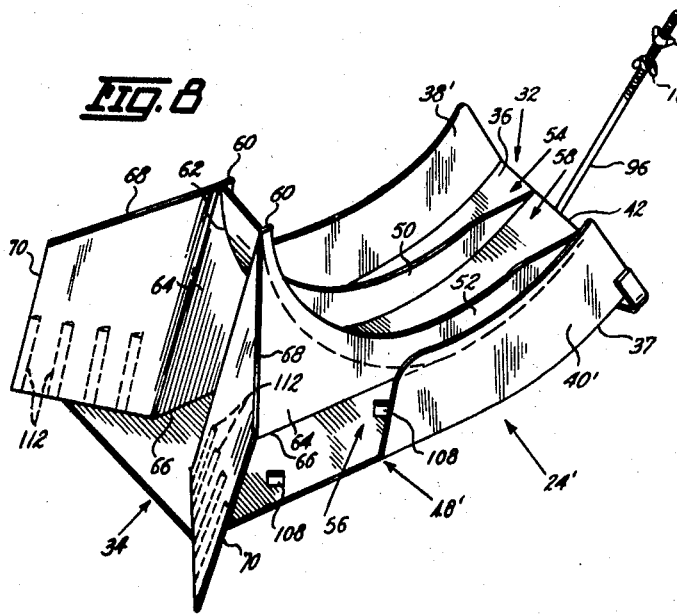
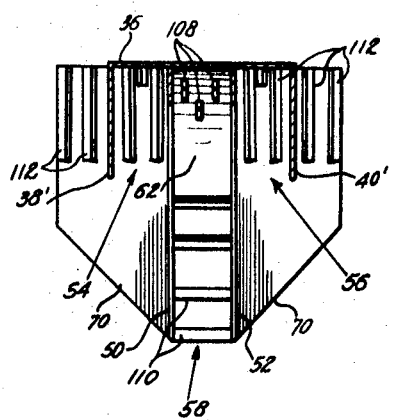
INVENTOR.
MELVIN E. DREIER

DISTRIBUTOR SPOUT FOR GRAIN AND SILAGE

BACKGROUND OF THE INVENTION

1. Field of the Invention

This invention relates to distributor spouts for delivering grain and silage and the like from a fill pipe to the interior of a silo and is an improvement over a similar device disclosed in my U.S. Pat. No. 3,321,252.

2. Description of the Prior Art

It is desirable in the filling of a silo that the grain or silage be distributed as evenly and uniformly as possible. Lack of such uniform distribution results in the formation of air pockets and a hard center core of material that adversely affect the fermentation process and has certain other well-known disadvantages which can be avoided by uniform distribution. Various means and devices have heretofore been devised to effect a uniform and even distribution but these generally include auxiliary attachments such as deflector plates and other mechanism including those which may be power operated and all of which require maintenance and repair. Such devices also appear to be relatively expensive and usually have limitations relative to fixed silo sizes. My U.S. Pat. No. 3,321,252 discloses one form of a side fill distributor spout which provides an even and uniform distribution of material into various size silos and one of the important features of the present invention is to improve said spout so that it may be effectively used in a center fill operation.

Another feature of the present invention is to adapt my distributor spout so that it will have the capabilities for cracking corn when such material is delivered to the silo.

Still another feature of this invention is to provide a distributor spout of the above class which may be quickly attached to and detached from conventional or standard fill pipes associated with various silos and is substantially free of any requirements for maintenance and repair.

SUMMARY

This distributor spout is a removable extension for the discharge end of a fill pipe associated with a silo and is designed to bridge the gap between the discharge end of the fill pipe and the opening in the silo through which the grain or silage will pass. Silos are filled either through the sloping side of the top which is known as a side fill or at the top center area for what is known as a center fill and that end of my distributor spout which is attached to the fill pipe is appropriately designed relative to a side fill or a center fill as may be required.

The discharge end of this spout is detachably secured to the discharge end of the fill pipe and is adjustable for the purpose of proper orientation as to its trajectory into the silo. Also, this spout is channelized to intercept the flow of material with each respective channel designed to direct a portion of the flow of material to different points within the silo to effect a uniform and even distribution of such material therein.

This spout in one embodiment is provided with certain obstacles in the path of flow when the material being stored in the silo is corn and by reason of such obstacles, the corn kernels are suitably cracked during their delivery into the silo. In addition, the corn cracking effect is further increased by providing suitable obstructions in the fill pipe.

BRIEF DESCRIPTION OF THE DRAWINGS

FIG. 1 is a fragmentary elevational view of the upper portion of a silo showing my new distributor spout mounted relative to the silo for directing material into the interior thereof at a center point in the top of the silo, FIG. 2 is an enlarged perspective view of the spout in FIG. 1 shown inverted in order to more clearly illustrate the construction thereof, FIG. 3 is a longitudinal sectional view of the spout shown in FIG. 1, FIG. 4 is a longitudinal sectional view of the spout similar to FIG. 3 but being a second embodiment thereof by disclosing the use of certain material obstruction members in the flow channels which have utility in cracking corn when such material is involved, FIG. 5 is a bottom view of the distributor embodiment shown in FIG. 4, FIG. 6 is a fragmentary perspective exploded view showing the mounting ring connecting assembly used with this spout for a center fill arrangement, FIG. 7 is a fragmentary elevational view similar to FIG. 1 but showing this spout adapted for a side fill operation relative to the silo and including the corn-cracking features of the spout shown in FIGS. 4 and 5, FIG. 8 is a perspective bottom view of the spout in FIG. 7 taken from the line 8—8 of FIG. 7, FIG. 9 is a longitudinal sectional view of the spout shown in FIG. 7, and FIG. 10 is a sectional view taken on the line 10—10 in FIG. 7.

DESCRIPTION OF THE PREFERRED EMBODIMENTS

The distributor spout which will be described herein is designed both for what is referred to as a center fill operation as shown in FIGS. 1–6, and as shown in FIGS. 7–10 is an improvement over the side fill spout disclosed in my U.S. Pat. No. 3,321,252. The basic structure of both the center fill and side fill embodiments so far as directional control of moving material is concerned is the same and thus like parts will be given like numerals and where certain parts in the side fill embodiment in figs. 7–10 have been slightly modified from comparable parts in the center fill structure of FIGS. 1–6, they will be given like parts primed.

With reference first to FIGS. 1–6 showing the adaptation of this spout for a center fill operation, the upper portion of a silo as seen in FIG. 1 is designated generally by the numeral 10. The top of the silo is of a truncated shape and in its regular construction has a top center opening located at the point designated 11 with such opening generally being provided with a rim 12 to receive a suitable removable closure (not shown) that in some cases takes the form of a submarine-type hatch held in place by suitable clamp means 13 which I use as will later appear. Such silo construction is well known and no invention is claimed therein. As seen in FIG. 1, a vertically disposed fill pipe 14 is suitably secured to the silo wall 16 by one or more brackets 18 and near the top of wall 16, a fill pipe extension is suitably secured to the top of pipe 14 and extends in a curved path over the top of the silo so as to terminate at its discharge point 22 in the general area of the center opening 11. Pipe extension 20 is suitably supported on the top of the silo by one or more braces 23. It will be understood that fill pipe i4 and pipe extension 20 may be a part of the general silo structure with the lower end of pipe 14 operatively associated with a source of grain or silage supply and a blower means (not shown) whereby the grain or silage is blown upwardly through pipe 14 and pipe extension 20. Various forms of spout fittings have been designed for attachment to pipe 20 at point 22 to deliver the grain or silage into the silo and it is for this purpose that I have designed my new spout which I will now describe.

Spout 24 is in effect an extension of pipe 20 from the discharge end 22 and in this regard it is noted that pipe 20 may be in the form of a closed conduit but is more generally of inverted channel shape having a top 26 with depending side flanges 28 and 30. The spout 24, which is also of a generally inverted channel shape, includes a receiving end 32 and a discharge end 34 as best seen in FIG. 2 where spout 24 is shown inverted to more clearly illustrate its construction. The top of spout 24 is designated generally by the numeral 36 and is flat so as to complement the top 26 of pipe 20 at point 22. Top 36 is flanked by the depending flanges 38 and 40 which project somewhat beyond edge 42 of top 36 at the receiving end 32 and at end 42, top 36 is provided with an opening 44 designed to register with an opening in top 26 near point 22 whereby top 36 is secured to top by means of a nut and bolt 46 as shown. In this connection, the extending portions of flanges 38 and 40 will overlay the respective flanges 28 and 30 on pipe 20 and, in effect, serve as extensions of the flanges on pipe 20.

Flanges 38 and 40 extend toward the discharge end 34 only to point 48 as best seen in FIG. 2 where top 36 becomes progressively wider to the discharge end 34. Intermediate flanges 38 and 40 there is secured to top 36 the spaced parallel depending partitions 50 and 52 which are of lesser depth than flanges 38 and 40 and are tapered near end 32 to the plane of the top 36 as best seen in FIG. 2. These partitions 50 and 52 effectively divide spout 24 into three parallel flow channels for grain and silage which include the outer channels 54 and 56 and the center channel 58. Partitions 50 and 52 extend from the receiving end 32 first parallel with the top 36 to approximately point 48 and then curve downwardly and slightly backwardly to their outer end 60. The intermediate area between the curved portions of partitions 50 and 52 is closed by the arcuate plate 62 which merges with top 36 so that the center channel 58 is designed to intercept a portion of the flow of grain or silage and to discharge it in a direction generally back toward the general location of the fill pipe 14. It will be seen at this point that the initial portions of channels 54 and 56 at receiving end 32 of spout 24 are also of an inverted channel shape, with channel 54 being formed by top 36, partition 50 and flange 38 and channel 56 being similarly formed by top 36, partition 52 and flange 40 so that material moving through the pipe 20 is actually intercepted and divided into three flow channels 54, 56 and 58 as it leaves the discharge end 34 of spout 24.

As seen in FIGS. 2 and 8, channel 56 has no outer sidewall or flange beyond point 48 and is progressively wider to the discharge end 34. The inner side of channel 56 is defined by the sidewall 64 which is an extension from the curved portion of partition 52. Wall 64 has an upper edge 66 abutting top portion 36 and a lower edge 68 extending from end point 60 upwardly and outwardly at an angle to form a lateral deflector 70 that terminates at the outermost outside edge of channel 56. The other outside channel 54 is similarly formed and like parts are given like numerals. By this arrangement, material is discharged from spout end 34 in three different directions which are substantially equidistant from each other relative to the circumference of the silo.

Thus far described, the channelized material flow structure of spout 24 is basically similar to comparable structure in my patent referred to above and which I have now adapted for use on a center fill silo as illustrated in FIG. 1 and for which I have provided an improved mounting structure for use of a side fill arrangement as illustrated in FIG. 7. In addition, I have improved spout 24 so that it can effectively serve as a corn-cracking means. With reference now more particularly to FIGS. 1, 2 and 6 I have provided a mounting ring assembly designated generally by the numeral 72 for spout 24 as follows.

A mounting ring 74, preferably of metal although any suitable rigid material will serve the purpose has a diameter so that it may be appropriately fitted to the rim 12 in opening 11 in the top of the silo 10 after the hatchlike cover (not shown) has been removed. Ring 74 is adapted to be securely fastened in place by the clamps 13 which are customarily present on center fill silos and normally serve the purpose of holding the hatch enclosure in place. Secured to an within the confines of ring 74, are two spaced parallel bars 76 and 78 as shown. The spacing between bars 76 and 78 is sufficient so as to permit assembly 72 to be placed over spout 24 as seen in FIG. 2 whereby bar 76 will be closely adjacent the outer side of flange 38 and bar 78 will be closely adjacent the outer side of flange 40. A threaded stud 80 projects from the outer side of flanges 38 and 40 as best seen in FIG. 6 and to each stud is secured one respective end of a pair of elongated slotted adjustment bars 82 and 84 by means of the nut and washer 86. Each ring bar 76 and 78 is provided with a pair of spaced threaded studs 88 and 90 upon which the adjustment bars 82 and 84 are arranged in a slidable relationship and secured therein by the appropriate nut and washer assemblies 92 and 94 as best seen in FIG. 2. Thus, in mounting spout 24 to rim 12 as seen in FIG. 1, any necessary angular adjustment of ring 74 for purposes of properly orienting spout 24 with its connection to pipe 20 can be accomplished by loosening the nut and washer assemblies 86, 92 and 94 whereby the slotted adjustment bars 82 and 84 will permit of such adjustment as is desired and as will be apparent. When the proper position for ring 74 has been obtained, the various nut and washer assemblies will be suitably tightened and ring 74 is secured in the rim 12 by the clamps 13.

With reference now more particularly to FIG. 7, I show an improved mounting arrangement for spout 24' in relation to a side fill type silo 10' together with its adaptation for cracking corn. The fill pipe 20' is shorter than pipe 20 for obvious reasons defining generally the shape of a gooseneck which permits the discharge end 22' to be supported by a diagonal brace 23' extending to the top of pipe 14 rather than being attached to the top of the silo as with braces 23 for pipe 20. In spout 24' as shown in FIG. 7, the outer flanges 38' and 40' terminate at the rear edge 42 of top 36 which has been defined as the receiving end 32 of spout 24' and such receiving end 32 is telescopically arranged over the discharge end 22' of fill pipe 20' in a hinged relationship so that it may be appropriately adjusted to change the trajectory of the material passing into the silo. It is also noted that the end portion of top 36 on spout 24' adjacent end 32 defines a slight curve as at 37 so that spout end 34 can be appropriately oriented to the side fill arrangement. For this purpose, one end of an adjustment rod 96 is pivotally secured to a suitable elevated brace 98 mounted on top 36 of spout of spout 24' as seen in FIG. 7 and the other end of rod 96 is designed to extend through a bracket means 100 secured to top 26' of pipe 20' near the discharge end 22'. The end of rod 96 associated with bracket 100 is threaded as at 102 and is provided with a pair of spaced wing nuts 104 and 106 as best seen in FIG. 8. Said wing nuts are located on respective opposite sides of bracket 100 and by appropriate adjustment of the same, spout 24' may be raised or lowered within a certain limited range to adjust its trajectory as required. With such a side fill mounting arrangement as shown in FIG. 7, spout 24' may be effectively used with silos of varying diameters by elevating spout 24' for larger diameter silos to obtain the desired uniform distribution.

It is well known that cracked corn has more nutritious value than uncracked corn and to provide either spout 24 or spout 24' with corn cracking capabilities I have provided in each of the flow channels 54, 56 and 58 a plurality of randomly arranged small barlike obstacles or studlike obstructions 108 which depend into the respective channels from top 36 as best seen in FIG. 5. Likewise, on the reverse curved end of the center channel 58 I have provided a plurality of spaced transverse ribs 110. In addition, a similar arrangement of spaced ribs 112 are provided on the inner surface of the deflectors 70 which define the discharge end of channels 54 and 56 and which will be transversely arranged across the flow path of the moving corn.

As a further improvement for facilitating the cracking of corn, I have provided a plurality of small studlike obstructions or obstacles in the fill pipes 20 and 20' similar to obstructions 108 and identified by the numeral 114. As seen in FIGS. 1 and 7, obstructions 114 depend from the top 26 of pipe 20 and top 26' of pipe 20' and are located approximately at a point above fill pipe 14 and at a curvature in the fill pipe where the flowing material is deflected toward discharge ends 22 and 22'.

It will be understood that grain or silage delivered from pipe 14 through pipes 20 or 20' and to the distributor 24 moves at a relatively rapid rate under considerable air pressure. In this regard, the obstructions 114 in the pipes 20 and 20' and the obstructions 108 and the ribs 110 and 112 in the spouts 24 and 24' are located at strategic points so that there will be a sharp impact therewith by the corn as it is moving to the discharge end 34. The arrangement of these various obstacles in the flow path of the corn is such that a substantial portion thereof is suitably cracked by the time it reaches the interior of the silo 10. The nature of such obstructions is such that it does not interfere with the through passage of the corn and yet at the same time provides sufficient impact points to produce the desired effect of cracking corn. Accordingly from the foregoing, it is thought a full understanding of the construction operation of this invention will be had and that the advantages of the same will be appreciated.

I claim:

1. A distributor spout for directing material such as grain and silage or the like into a closed storage container wherein said container has a top provided with a center opening and wherein a fill pipe is disposed exteriorly of said container for association with material moving apparatus and said fill pipe extends in an arcuate path over said top to terminate in a discharge end oriented toward but spaced from said center opening, said spout comprising:
   a spout of generally inverted channel shape defining a top and spaced depending flanges and having respective receiving and discharge ends,
   a mounting ring in encircling arrangement relative to said spout intermediate the receiving and discharge ends thereon,
   means for securing said ring to said container in registration with the center opening therein,
   means adjustable connecting said spout to said ring to permit of the angular adjustment of the longitudinal axis of said spout relative to the axis of said ring, and
   means securing the receiving end of said spout to the discharge end of the fill pipe so that the discharge end of said spout is disposed interiorally of said container.

2. A spout as defined in claim 1 wherein the means to adjustably connect said spout to said ring comprises:
   a pair of bars secured to and within the confines of said ring in spaced parallel relationship,
   said spout extending through said ring and intermediate said bars,
   a respective stud projecting from each flange on said spout,
   a pair of elongated slotted adjustment bars at each side of side spout with one end of each bar of each pair pivotally journaled on a respective stud,
   means to selectively lock said adjustment bars against pivotal movement relative to said studs.
   means slidably connecting each of the bars within said ring to the respective slotted lengths of each respective pair of adjustment bars to permit of the angular adjustment of said spout relative to said ring, and
   means to selectively lock said ring against relative movement with said adjustment bars.

3. A spout as defined in claim 1 including a plurality of spaced obstacles disposed within said inverted channel-shaped spout so as to be in the path of flow of material passing there through and against which at least part of said material will impact.

4. A spout as defined in claim 1 including a plurality of spaced obstacles disposed in said spout at the discharge end thereof so as to be in the path of flow of material passing thereby and against which at least part of said material will impact.

5. A spout as defined in claim 1 including the combination of a plurality of spaced obstacles disposed within the fill pipe associated with said container so as to be in the path of flow of material passing therethrough and against which at least part of said material will impact.

* * * * *